United States Patent [19]
Song

[11] Patent Number: 5,805,229
[45] Date of Patent: Sep. 8, 1998

[54] APPARATUS FOR SIMULTANEOUSLY GENERATING INTERPOLATED VIDEO SIGNALS FOR EVEN AND ODD LINES

[75] Inventor: Gang-Woog Song, Seoul, Rep. of Korea

[73] Assignee: Daewoo Electronics Co., Ltd., Seoul, Rep. of Korea

[21] Appl. No.: 579,684

[22] Filed: Dec. 28, 1995

Related U.S. Application Data

[63] Continuation-in-part of Ser. No. 297,991, Aug. 30, 1994, abandoned.

[30]     Foreign Application Priority Data

Aug. 31, 1993 [KR] Rep. of Korea ....................... 93-17202

[51] Int. Cl.$^6$ .................................................. H04N 7/12
[52] U.S. Cl. .......................... 348/424; 348/427; 348/441
[58] Field of Search .................................. 348/441, 448, 348/453, 458, 424, 425, 427, 428, 392; H04N 7/12

[56]             References Cited

U.S. PATENT DOCUMENTS

| | | | |
|---|---|---|---|
| 4,608,600 | 8/1986 | Sugiyama | 348/424 |
| 4,866,519 | 9/1989 | Lucas et al. | 348/427 |
| 5,151,783 | 9/1992 | Faroudja | 348/448 |
| 5,307,164 | 4/1994 | Dong-Il | 348/448 |
| 5,337,089 | 8/1994 | Fisch | 348/448 |

OTHER PUBLICATIONS

Christophe Joanblanq et al "A 54MHz CMOS Programmable Video Signal Processor for HDTV Applications", IEEE Journal of Solid–State Circuits, 25, No. 3, pp. 730–734, Jun. 1990.

*Primary Examiner*—Mark R. Powell
*Assistant Examiner*—John W. Miller
*Attorney, Agent, or Firm*—Anderson, Kill & Olick, P.C.

[57]             ABSTRACT

An apparatus converts a subsampled video frame signal into an interpolated original video signal with a improved computational speed by using: a zero stuffing circuit for generating the (N+1)/2 video line signals alternately decimated; a first interpolation circuit for generating an interpolated even video line signal; a second interpolation circuit for generating an interpolated odd video line signal; and delay lines for simultaneously coupling the (N+1)/2 video line signals to the first and the second interpolation circuits to thereby allow the simultaneous generation of the interpolated even and odd video line signals.

2 Claims, 4 Drawing Sheets

FIG.2

APPARATUS FOR SIMULTANEOUSLY GENERATING INTERPOLATED VIDEO SIGNALS FOR EVEN AND ODD LINES

CROSS-REFERENCE TO THE RELATED APPLICATIONS

This application is a continuation-in-part of U.S. Ser. No. 08/297,991 filed on Aug. 30, 1994, now abandoned.

FIELD OF THE INVENTION

The present invention relates to an apparatus for decoding a coded video signal and, more particularly, to an apparatus for converting a subsampled video frame signal into an original video frame signal with an improved computational speed.

DESCRIPTION OF THE RELATED ART

In digital television systems such as video-telephone, teleconference and high definition television, a large amount of digital data is required to define each video frame signal since a video line signal in the video frame signal comprises a sequence of digital data referred to as pixel values. However, the available frequency bandwidth of a conventional transmission channel to transmit the data is limited. Therefore, it has become necessary to reduce the substantial amount of data by way of employing various data compression techniques, for example, a bandwidth reduction technique.

In order to effectively carry out the data compression, the bandwidth reduction technique is implemented by a conventional subsampling process for decimating or eliminating a part of the pixel values or all of the pixel values of a video line signal contained in the video frame signal to thereby reduce the bandwidth requirement for transmitting the video frame signal.

The subsampled video frame signal is then transmitted via a communication channel and; at a receiver, converted into the original video frame signal through the use of a conventional interpolation technique. The conventional interpolation is implemented by: stuffing omitted pixel values or a decimated video line signal contained in the subsampled video frame signal with zero values; and filtering the zero-stuffed video frame signal to thereby generate interpolated even and odd video line signals alternately or sequentially. In this interpolation, it would be desirable to reduce a substantial amount of computational time through the use of a high-speed dedicated circuit. However, since it is required to calculate all of the pixel values including pixel values stuffed with zero values, it may take a substantial amount of wasteful calculation time. Further, since a conventional dedicated circuit has only one calculation path which alternately or sequentially generates interpolated even and odd video line signals in order to form an interpolated original video signal, it is difficult to improve the calculation speed.

SUMMARY OF THE INVENTION

It is, therefore, a primary object of the present invention to provide an apparatus for converting a subsampled video frame signal into an interpolated original video signal with an improved computational speed.

In accordance with the invention, there is provided an apparatus for converting a subsampled video frame signal into an interpolated video frame signal, wherein the interpolated video frame signal has N video line signals and the subsampled video signal includes (N+1)/2 video line signals alternately decimated, N being a positive odd integer larger than 1, which comprises: means for generating the (N+1)/2 video line signals contained in the subsampled video signal; first interpolation means for generating an interpolated even video line signal; a second interpolation means for generating an interpolated odd video line signal; and means for simultaneously coupling the (N+1)/2 video line signals to the first and the second interpolation means to thereby allow the first and the second interpolation means to simultaneously generating the interpolated even and odd video line signals.

In accordance with the present invention, preferably, the first and second interpolation means include (N+1)/2 one-dimensional transversal filters to form a 2-dimensional symmetric filter.

BRIEF DESCRIPTION OF THE DRAWINGS

The above and other objects and features of the present invention will become apparent from the following description of preferred embodiments given in conjunction with the accompanying drawings, in which:

FIG. 2 is an exemplary diagram showing a subsampled pixel pattern;

DETAILED DESCRIPTION OF THE PREFERRED EMBODIMENTS

Figure 1:
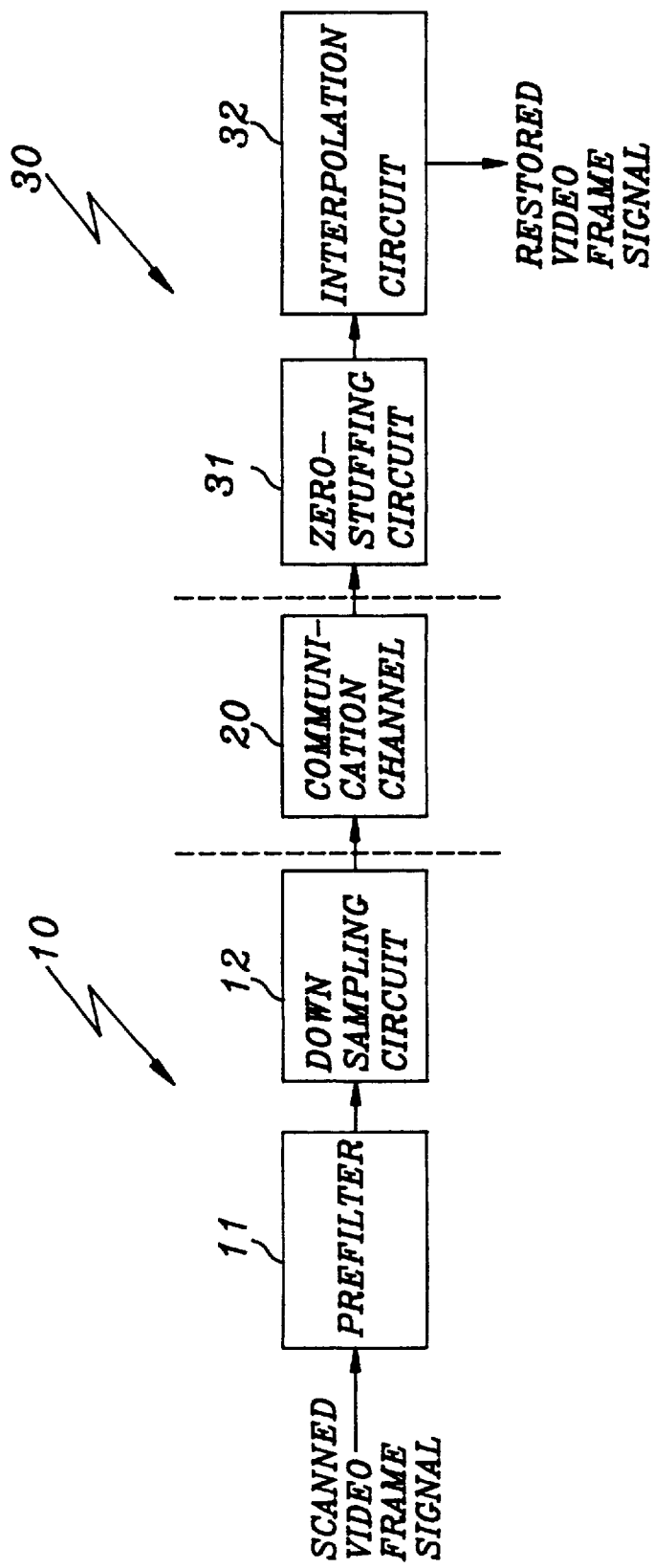
FIG. 1 is a schematic block diagram of an encoding system employing an interpolating processor in accordance with the present invention.

Referring to FIG. 1, there is shown a block diagram of a coding system employing a conventional subsampling technique and a dedicated interpolation circuit in accordance with the present invention. The coding system includes an encoding circuit 10, a communication channel 20 and a decoding circuit 30.

The encoding circuit 10 is provided with a pre-filter 11 and a down sampling circuit 12; and serves to convert a scanned original video frame signal into a subsampled video frame signal. The scanned video frame signal includes a plurality of video line signals, each of which has a plurality of pixel data. The scanned video frame signal is coupled to the pre-filter 11 which serves to filter the scanned video frame signal in order to shape the scanned video frame signal spectrum while preserving the initial high-definition information contained therein. The filtered video frame signal is then coupled to the down sampling circuit 12 wherein the filtered video frame signal is subsampled in order to decimate or eliminate a predetermined part of pixel values or all of the pixel values of a predetermined line signal contained in the filtered video frame signal. The subsampled video frame signal from the down sampling circuit 12 is then transmitted via the communication channel to the decoding circuit 30 contained in a receiver.

The decoding circuit 30 includes a zero stuffing circuit 31 and an interpolation circuit 32; and serves to restore the subsampled video frame signal to the original video frame signal. The subsampled video frame signal is coupled to the zero stuffing circuit 32 wherein omitted pixel values of the video line signal are stuffed with zero values to generate zero-stuffed video line signals. The zero-stuffed video line signals are coupled to the interpolation circuit 32 which serves to generate the original video signal by interpolating the stuffed video line signals.

Figure 2:
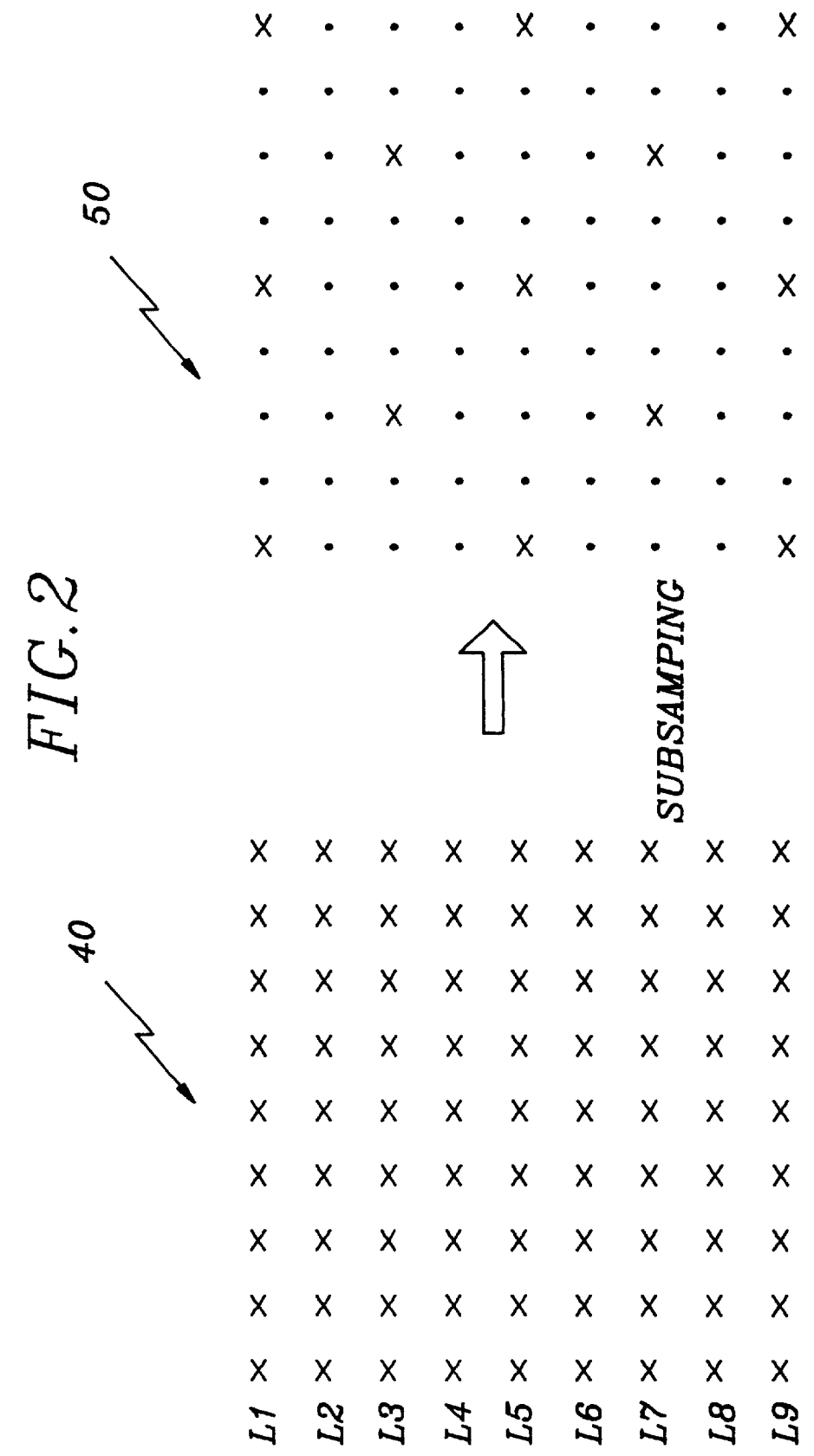

Referring to FIG. 2, there is provided an exemplary diagram showing the subsampled video signal. The scanned video frame signal, as is well known in the art, includes a multiplicity of video line signals, each of which includes a plurality of pixel values. For the sake of simplicity, assuming that the scanned video frame signal includes 9 video line signals, L1 to L9, each of which includes 9 pixel values marked by "X" so that the pixel values are arranged in a matrix pattern, i.e., 9×9 matrix. At the down sampling circuit 12 shown in FIG. 1, the video frame signal 40 is subsampled by a factor of 4:1 in the horizontal direction and a factor of 2:1 in the vertical direction, wherein the omitted pixel values are marked by "." and the remaining pixel values are designated by "X". As a result of the subsampling process, all of the pixel values contained in the even video line signals L2, L4, L6, and L8 are decimated, while three pixel values between two remaining pixel values contained in the odd video line signals L1, L3, L5, L7 and L9 are omitted. The subsampled video signal 50 containing the remaining pixel values is coupled via the communication channel 20 to the zero stuffing circuit 31 as shown in Fig. 1. In the zero stuffing circuit 31, the omitted pixels of the odd video line signals L1, L3, L5, L7 and L9 are stuffed with zero values and the zero stuffed odd video line signals L1, L3, L5, L7 and L9 are then sequentially coupled to the interpolation circuit 32.

Figure 3:
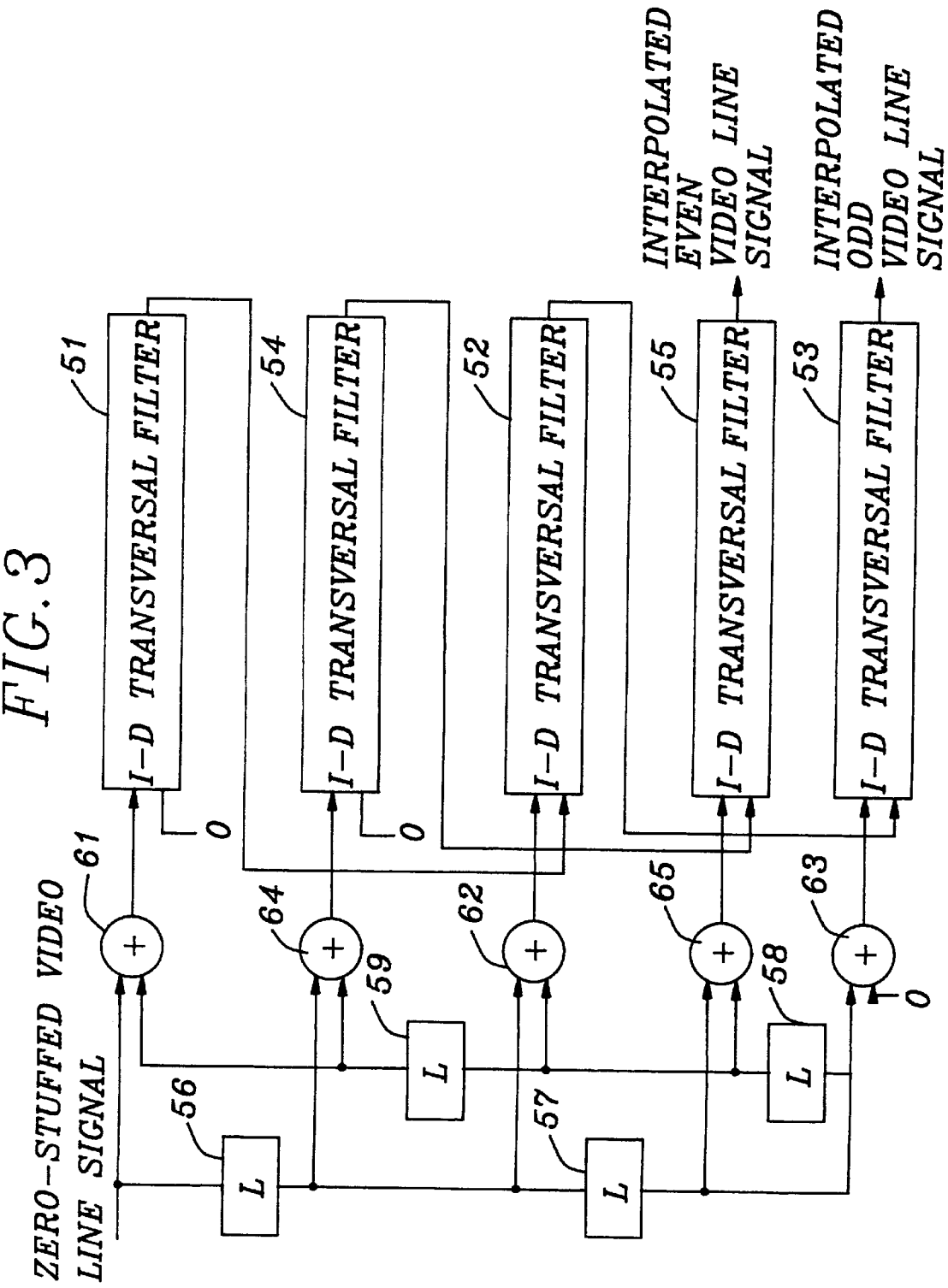
FIG. 3 is a block diagram of the interpolation processor shown in FIG. 1.
Figure 4:
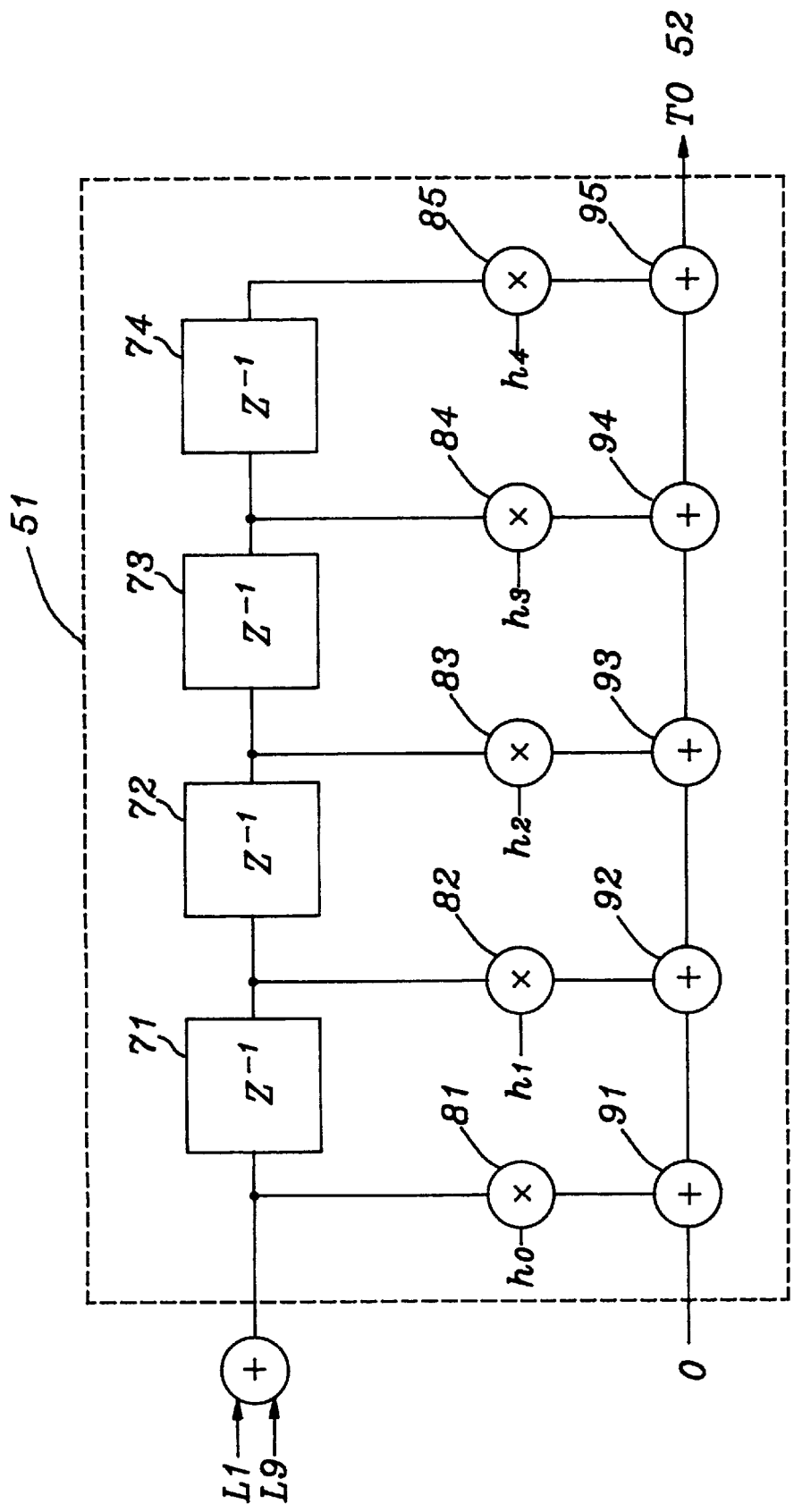
FIG. 4 is a detailed diagram of the 1-dimensional filters shown in FIG. 3.

Referring to FIGS. 3 and 4, there are provided detailed diagrams of the interpolation circuit shown in FIG. 1 and of the 1-dimensional transversal filter shown in FIG. 3. The interpolation circuit 32 includes a first and a second calculation paths.

The first calculation path includes a conventional 2-dimensional symmetric filter built by cascading one-dimensional transversal filters 51, 52, 53. The 1-dimensional transversal filter includes a plurality of filter cells, each filter cell having a multiply-add (MA) function so that the 2-dimensional symmetric filter also includes a plurality of filter cells arranged in a matrix pattern and the number of filter cells for m by n, e.g., 9×9, different pixel values is equal to ((m+1)/2)×((n+1)/2), e.g., 5×5, with odd values for m and n, which is obtained by cascading 5 1-dimensional transversal filters, each having 5 filter cells (see, e.g., an article by Christophe Joanblanq et al., "A 54-MHz CMOS Programmable Video Signal Processor for HDTV Applications", *IEEE Journal of Solid-State Circuits*, 25, No.3, pp. 730–734(Jun., 1990)). As shown in FIG. 4, the 1-dimensional transversal filter 51 includes 5 filter cells, each of which has a multiplier 81 for multiplying a pixel value with a filter coefficient $h_0$ and an adder 91, to serve the MA function. A pixel delay 71 is coupled between two filter cells. In accordance with the present invention, as shown in FIG. 3, the zero-stuffed odd video line signals L1 and L9, each having 9 pixel values, are coupled via an adder 61 and delay lines 56, 57, 58 and 59 to the 1-dimensional transversal filter 51, wherein each of the delay lines 56, 57, 58 and 59 includes a line delay memory and an in-out delay memory of the 1-dimensional traversal filter so that the zero-stuffed odd video line signals L1 and L9 are simultaneously coupled to the adder 61. In a similar manner, the zero-stuffed odd video line signals L3 and L7 are coupled via an adder 62 and delay lines 56, 57 and 58 to the 1-dimensional transversal filter 52; and the zero-stuffed odd video line signal L5 and a zero-valued dummy video line signal "0" are coupled through an adder 63 and delay lines 56 and 57 to the 1-dimensional transversal filter 53. Therefore, in order to process 5×9 input pixel values excepting the omitted pixel values contained in the even video lines L2, L4, L6 and L8, the first calculation path includes said three 1-dimensional transversal filters 51, 52, and 53 cascaded, each having 5 filter cells. Outputs from the 1-dimensional transversal filters 51, 52, and 53 are combined and a filtered or interpolated odd video line signal is generated at the 1-dimensional transversal filter 53.

The second calculation path includes a conventional 2-dimensional symmetric filter built by cascading 1-dimensional transversal filters 54 and 55. The zero-stuffed odd video line signals L3 and L9, each having 9 pixel values, are coupled via an adder 64 and delay lines 56, 57, 58 and 59 to the 1-dimensional transversal filter 54. In a similar manner, the zero-stuffed odd video line signals L5 and L7 are coupled via an adder 65 and delay lines 56, 57 and 58 to the 1-dimensional transversal filter 55. Therefore, in order to process 5×9 input pixel values excepting the omitted pixel values contained in the even video lines L2, L4, L6 and L8, the second calculation path includes said two 1-dimensional transversal filters 54 and 55 cascaded, each having 5 number of the filter cells. Outputs from the 1-dimensional traversal filters 54 and 55 are combined and a filtered or interpolated even video line signal is generated at the 1-dimensional transversal filter 55.

As may be seen from the above, it should be appreciated that, since the inventive interpolation circuit serves to perform the interpolation process for a subsampled video frame signal by using video line signals containing the remaining pixel values after the subsampling process, a substantial amount of reduction in the calculation time can be attained. Further, the interpolated odd and even video line signals are simultaneously generated through the use of two calculation paths without needing any additional hardware components.

While the present invention has been described with reference to the particular embodiments, it will be apparent to those skilled in the art that various changes and modifications may be made without departing from the spirit and the scope of the invention as defined in the following claims.

What is claimed is:

1. An apparatus for converting a subsampled video signal into an original video signal, wherein the original video signal has N video line signals and the subsampled video signal includes (N+1)/2 video line signals alternately decimated, N being a positive odd integer larger than 1, which comprises:

means for generating the (N+1)/2 video line signals;

first interpolation means for generating an interpolated even video line signal;

second interpolation means for generating an interpolated odd video line signal; and means for simultaneously coupling the (N+1)/2 video line signals to the first and the second interpolation means to thereby allow the first and the second interpolation means to simultaneously generate the interpolated even and odd video line signals.

2. The apparatus as recited in claim 1, wherein the first and the second interpolation means include (N+1)/2 one-dimensional transversal filters to form a 2-dimensional symmetric filter.

* * * * *